(12) United States Patent
Konoplev et al.

(10) Patent No.: US 8,842,889 B1
(45) Date of Patent: Sep. 23, 2014

(54) SYSTEM AND METHOD FOR AUTOMATIC FACE RECOGNITION

(75) Inventors: Alexey Konoplev, St. Petersburg (RU); Yury Volkov, St. Petersburg (RU)

(73) Assignee: Luxand, Inc., Alexandria, VA (US)

( * ) Notice: Subject to any disclaimer, the term of this patent is extended or adjusted under 35 U.S.C. 154(b) by 517 days.

(21) Appl. No.: 13/327,804

(22) Filed: Dec. 16, 2011

Related U.S. Application Data (60) Provisional application No. 61/424,627, filed on Dec. 18, 2010.

(51) Int. Cl.
*G06K 9/00* (2006.01)

(52) U.S. Cl.
CPC .......... *G06K 9/0061* (2013.01); *G06K 9/00281* (2013.01); *G06K 9/00228* (2013.01); *G06K 9/00288* (2013.01)
USPC .......................................... 382/117; 382/118

(58) Field of Classification Search
None
See application file for complete search history.

(56) References Cited

U.S. PATENT DOCUMENTS

2007/0160267 A1* 7/2007 Jones et al. .................... 382/117
2012/0321140 A1* 12/2012 Xiong et al. .................. 382/108

\* cited by examiner

*Primary Examiner* — Barry Drennan
(74) *Attorney, Agent, or Firm* — Bardmesser Law Group (57) ABSTRACT

A system, method and computer program product for face recognition in digital images containing portraits or images of human faces. The facial images are detected and pupil coordinates are calculated. A facial image is converted into a black and white image. A rectangle containing the face is identified. Then, pupil coordinates are determined. A rectangle of a pre-defined size is cut out from the image so the pupils are located at pre-defined coordinates. External lighting effects are reduced and an image template is generated by calculating sets of values of different image points.

10 Claims, 5 Drawing Sheets

Original image with pupils identified

Original image with face identified

SYSTEM AND METHOD FOR AUTOMATIC FACE RECOGNITION

CROSS-REFERENCE TO RELATED APPLICATION

This application claims priority to a Provisional U.S. Patent Application No. 61/424,627, filed on Dec. 18, 2010 incorporated by reference herein in its entirety.

BACKGROUND OF THE INVENTION

1. Field of the Invention

The present invention is directed to face recognition, and more particularly, to face recognition in photographs and digital images containing human faces.

Photographs have been used historically for personal identification. With the arrival of a digital photography, a need to identify pictures of human faces remained the same. However, automatic recognition of human faces within the digital images had become a problem. Furthermore, it is important to recognize that a previously identified (and possibly corrected) facial image belongs to the same person. By determining a probability that the person whose face is analyzed is not the person with rights to access a particular resource, an efficient access protection system can be implemented.

Accordingly, there is a need in the art for a system and method that addresses the need for automatic recognition of facial images within the digital images.

SUMMARY OF THE INVENTION

The present invention is intended as a method and system for face recognition in digital images containing human faces that substantially obviates one or several of the disadvantages of the related art.

In one aspect of the invention there is provided a system, method and computer program product for automatically detecting facial images within the digital images.

According to an exemplary embodiment, the facial images are detected and pupil coordinates are calculated. A facial image is converted into a black and white image. A rectangle containing the face is identified. Then, pupil coordinates are determined. A rectangle of a pre-defined size is cut out from the image so the pupils are located at pre-defined coordinates. External lighting effects are reduced and an image template is generated by calculating sets of values of different image points.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
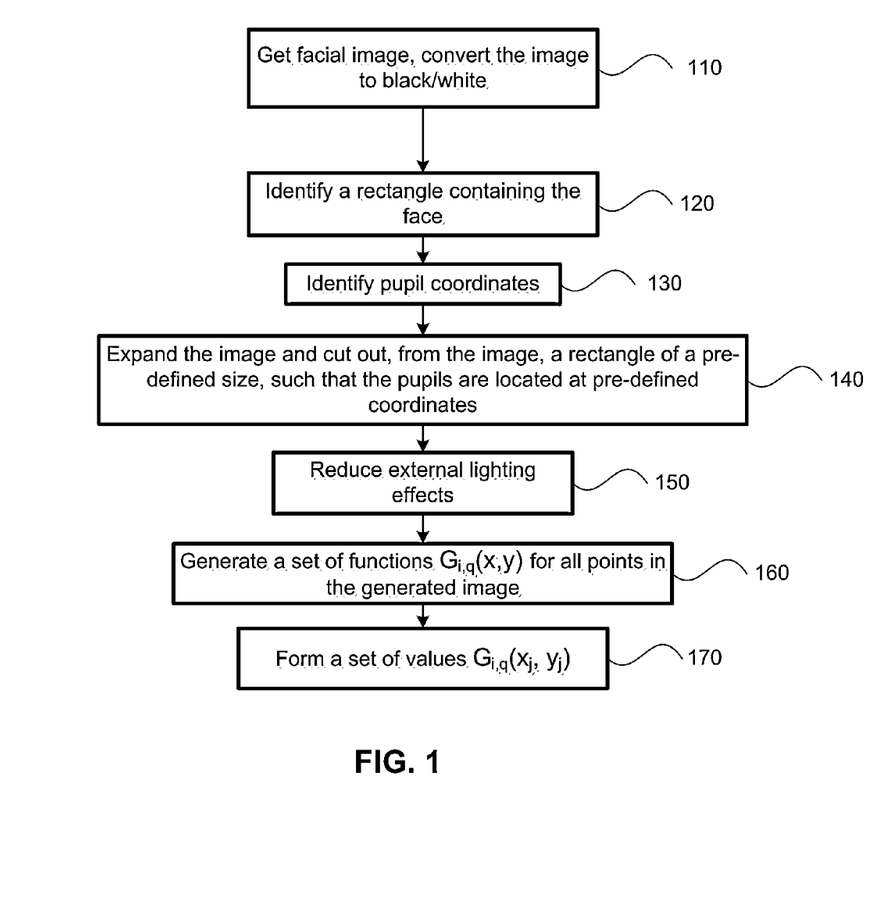
FIG. 1 illustrates a process that receives and processes an image and builds a template (or a set of values representing the image), in accordance with the exemplary embodiment.
Figure 2:
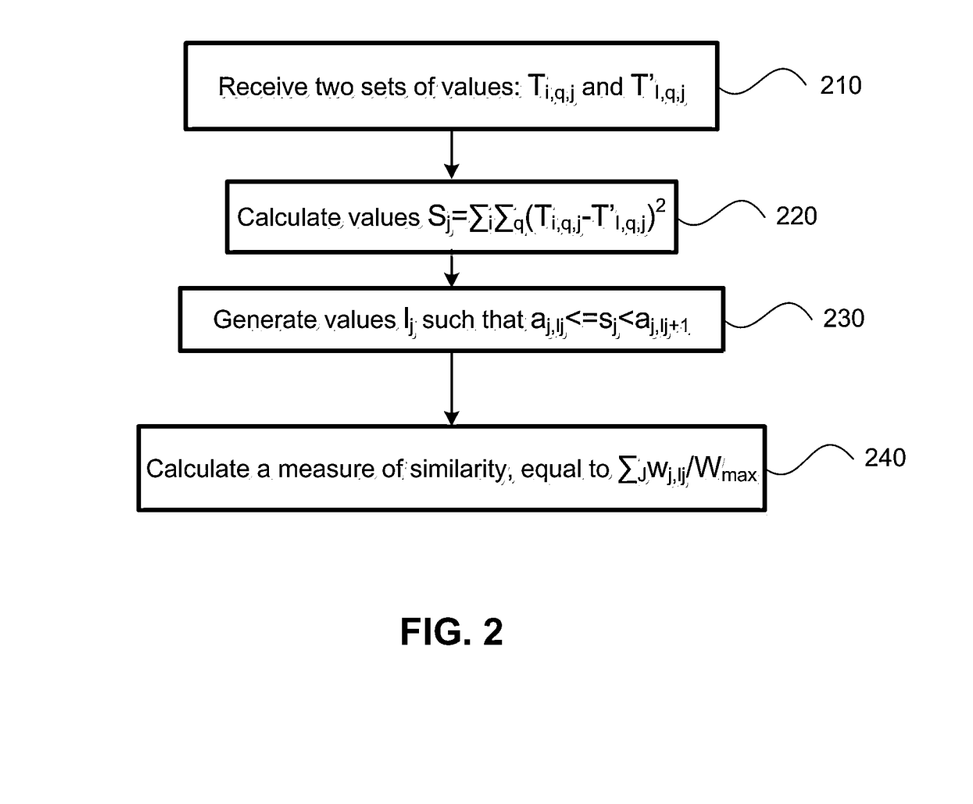
FIG. 2 illustrates a process for analyzing image templates and generating a measure of similarity (between 0 and 1), in accordance with the exemplary embodiment.

According to the exemplary embodiment, in order to better recognize faces, two mathematical functions have been developed:

a function, that receives an image and builds a template (or a set of values, representing the photograph)—see FIG. 1; and a function that receives two templates as inputs, and generates a measure of similarity (between 0 and 1)—FIG. 2.

The greater the measure, or degree, of similarity, the greater the probability that the two templates are taken from facial images represent the same person. The proposed method includes the following embodiments: the algorithm for generating a template, the algorithm for comparison of the templates, and several scenarios in which the proposed approach can be used.

FIG. 1 illustrates a process that receives and processes an image and builds a template (or a set of values representing the image), in accordance with the exemplary embodiment. A facial image is acquired and converted into black and white image in step 110. A rectangle containing the face is identified in step 120. Then, pupil coordinates are identified in step 130. A rectangle of a pre-defined size containing the pupils located at pre-defined coordinates is cut out of the image in step 140.

External lighting effects are reduced in step 150. In step 160, a set of functions G (x, y) is generated for all points of the image. Then, the values of the function G in each point are calculated.

FIG. 2 illustrates a process for analyzing image templates and generating a measure of similarity (between 0 and 1), in accordance with the exemplary embodiment. In step 210 template data is acquired. The templates consist of the values $T_{i,q,j}=G_{i,q}(x_j, y_j)$ for all the functions $g_1(x, y)$, integer q from the interval $[0, d_i-1]$ and the points $(x_j, y_j)$.

The first template consists of the values $T_{i,q,j}$, and the second template consists of the values $T'_{i,q,j}$. For each J, the number $s_j$ is calculated in step 220 as follows:

$$s_j = \sum_i \sum_{q=0}^{d_i-1} (T_{i,q,j} - T'_{i,q,j})^2$$

For each j, there is a $a_{j,k}$ for k=0 ... $n_j$ such that $0=a_{j,0}<a_{j,1}< ... <a_{j,nj}1=1$, and also a set of weights $w_{j,k}>0$ for k=

0 ... $n_j-1$. Then, for each j there is a $0<=l_j<n_j$ such that $a_{j,l_j}<=s_j<a_{j,l_j+1}$ (except for the case $s_j=1$, where $l_j=n_{j-1}$). The value $l_j$ is generated in step 230. In step 240, the measure of similarity is calculated as $\Sigma_j w_{j,1_j}/W_{max}$, where $W_{max}=\Sigma_j \max_{0 \le k < n_j} w_{j,k}$.

Figure 3:
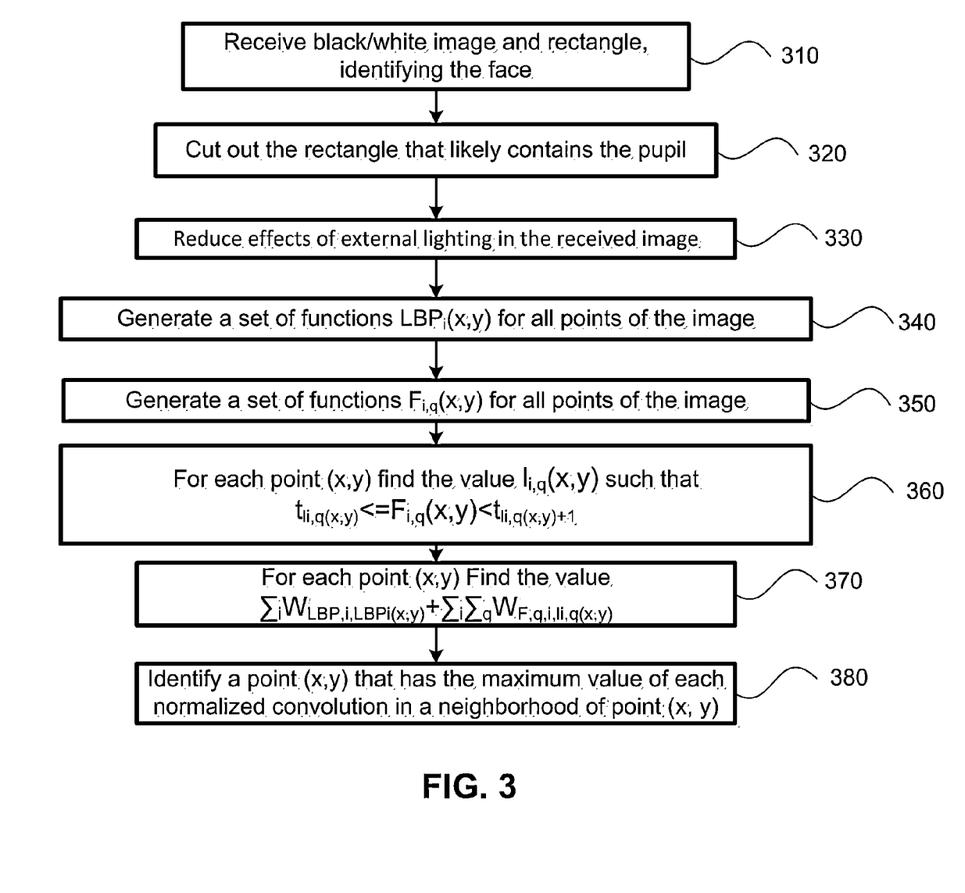
FIG. 3 illustrates a process for identifying the pupils, in accordance with the exemplary embodiment.

FIG. 3 illustrates a process for identifying the pupils, in accordance with the exemplary embodiment. A black and white image and a rectangle identifying a face are acquired in step 310. A rectangle that is likely to contain the pupil is cut out in step 320. Effects of external lighting are reduced in step 330. For all points of the image, a set of functions $LBP_i(x, y)$ are generated in step 340. Then, in step 350, a set of functions $F_{i,q}(x, y)$ is generated for all point of the image. Subsequently, in step 360, the value $1_{i,q}(x,y)$, such that $t_{1i,q(x,y)} <= F_{i,q}(x,y) < t_{1i,q(x,y)+1}$ is found.

Then, in step 370, for each point (x, y) the value $\Sigma_i W_{LBP,i,LBPi(x,y)} + \Sigma_i \Sigma_q W_{F,q,i,1i,q(x,y)}$ is found. Then, in step 380, a point (x, y) that has the maximum value of each normalized convolution in a neighborhood of a point (x, y) is identified. This point has the best coordinates for the pupil.

According to the exemplary embodiment, the algorithm for generating image templates is used. An image containing a face is used as an input data. If an image is a color image, it is converted into a black and white format. Preferably, the image should represent a single face. According to the exemplary embodiment, if there are several faces within the image, the template of just a single face is generated.

At the same time, if the image contains several faces (for example, in a group picture), then areas in the picture that contain only a single face can be identified and templates can be created for the individual faces.

Using known algorithms for face detection (for example, Viola-Jones algorithm, see P. Viola, M. Jones, *Robust real-time object detection*, Technical Report CRL 20001/01, Cambridge Research Laboratory, 2001), a rectangle that encloses and contains the face is identified in the picture. The rectangle R is cut out from the picture (image) and is normalized to some standard size (for example, 128×128 pixels).

Figure 4:
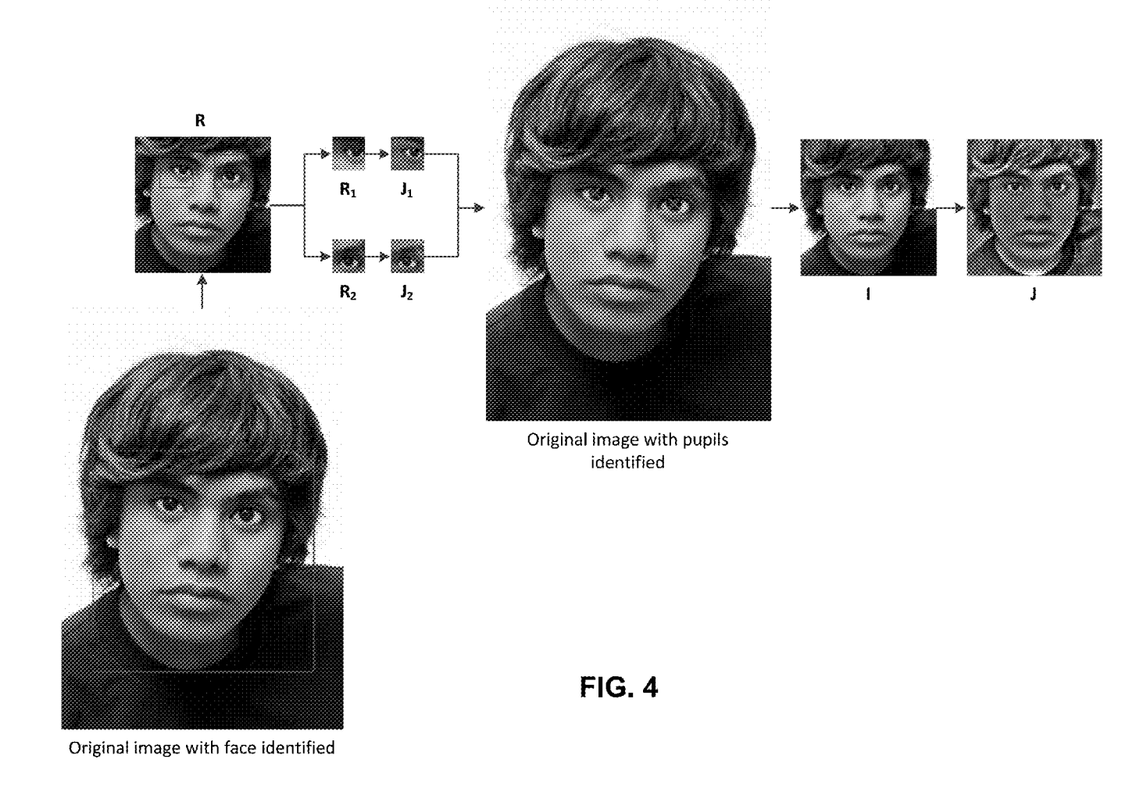
FIG. 4 illustrates an example of application of an exemplary method to a particular image, in accordance with the exemplary embodiment.

In the rectangle R, the algorithm identifies the pupils. The process for identifying the pupils is depicted in FIG. 4. Statistics relating to the coordinates (relative to the rectangle R) are gathered in advance and left and right pupils are located. Based on the statistics, and the already identified rectangle R, the two rectangles $R_1$ and $R_2$ are identified, which contain the right and the left pupils.

According to the exemplary embodiment, a transformation is performed on the image $R_1$ (for example, the illumination compensation, as described in Xie, X., Lam, K.-M., 2006, "An efficient illumination normalization method for face recognition." Pattern Recognition Lett. 27, 609-617, incorporated herein by reference in its entirety), which reduces the effect of external lighting on the image. As a result, the image $J_1$ is generated.

Then, in all points of the image $J_1$, the uniform LBP transformation is calculated (see T. Mäenpää, T. Ojala, M. Pietikäinen, and M. Soriano, "Robust texture classification by subsets of local binary patterns", in Proc. 15th International Conference on Pattern Recognition, Barcelona, Spain, 2000, incorporated herein by reference in its entirety).

The uniform LBP transformation has the following parameters: radius, number of points on the radius (so called LBP parameters). For example, it is possible to use the uniform LBP transformation with 8 points, with radii 2, 4 and 8. It is also possible to perform a non-uniform LBP transformation, rather than a uniform LBP transformation. As a result, the functions $LBP_i(x, y)$ are generated, $LBP_i(x, y) \in [0, N_{i-1}]$ (integer numbers), where $N_{i-1}$ is the number of LBP codes for the ith set of parameters. For the 8 point example, and uniform LBP transformation, this number equals to 59. Note that the $LBP_i(x, y)$ set could be empty as well.

Thus, for each $LBP_i(x, y)$ and for each integer number $j \in [0, N_i-1]$, there is a previously calculated weight $W_{LBP,i,j,hx,hy}(x, y)$ (calculated during the process of training of the system), where $(h_x, h_y)$ traverses the set $O_{LBP,i}$. For example, a set $[-7,7] \times [-7,7]$ for all i (or, for each i, there could be its own set). This set defines a neighborhood, from which the information about the image is derived. In this case, the neighborhood will be 15×15 pixels.

A set of functions $f_1(x,y), f_2(x,y) \ldots f_n(x,y)$ is generated. It is required that the function $f_i(x, y)=0$, if $x^2+y^2>r_i^2$. In other words, $r_i$ is the radius of a circle, outside of which $f_i$ equals 0. Alternatively, the condition "$f_i(x, y)=0$" can be replaced with the condition "$f_i(x, y)$ is a small value". As function $f_i$, the cosine function $\cos 2\pi x/r_i$ for $x^2+y^2<=r_i^2$, which equals to 0 for all other points (x, y), can be used.

Exemplary radii that can be used are $r_1=3.5$, $r_2=5.6$. Other functions or filters can be used as $f_i$ (for example, Gabor wavelets, as well as others). Also, the function g described below can be used as a filter, as well. For the best results, a linear transformation off is recommended. In other words, replacing $f_i$ with $(f_i-c)/k$, where k and c are constants, such that the conditions $\iint f_i = 0$ and $\iint f_i^2 = 1$ are satisfied.

Then, each function $f_i$ is rotated to an angle $q\pi/c_i$ and convolved with $J_1$, where $q=0 \ldots c_i-1$ represents the number of possible orientations. For example, $c_i=8$ can be used for all i. Generally, it is possible to use an arbitrary number of orientations (which should be greater than 0)—the greater the number of possible orientations, the more accurate will be the face recognition.

For all convolutions with the function $f_i$, their value at the point (x, y) is divided by a standard deviation of the values of the pixels of $J_1$ in the circle of radius $r_i$ centered at the point (x, y). Thereby, a set of normalized convolutions is generated.

Then, $M_i(x, y)$—maximum of each normalized convolution in a particular (previously defined) neighborhood of point (x, y)—is calculated. Finally, each normalized convolution is divided by the value of $\Sigma M_i(x, y)$ (i.e., the sum of all possible $M_i$ at the point (x, y)). As a result, the set of functions $F_{i,q}(x,y)$, where $q=0 \ldots c_i-1$, is generated, with a range of [0, 1].

According to the exemplary embodiment, the best size for a neighboring area for the calculation of the $M_i$ should be chosen based on the radius $r_i$. The greater $r_i$, the greater the neighborhood area for the function $f_i$. For example, for the radii mentioned above, it is possible to take a square neighborhood of a size 8 (for both radii).

Both $LBP_i(x, y)$ and $F_{i,q}(x, y)$ are now represent so-called "features" of the image. Note that an additional function can be defined for representing the original pixel values of $J_1$ (non-transformed and non-convoluted). This function can be added to the set of functions $F_{i,q}(x, y)$. This function should be normalized to a range of [0, 1]. Thus, the features of the image would contain the image itself.

In principle, the $LBP_i(x, y)$ set could be empty, and the $F_{i,q}(x, y)$ set could contain the image pixel values alone, so no convolutions or other transformations are required to generate the "features." This can be useful when the pupils are detected with decision trees, to speed up the detection process.

To detect pupil coordinates, the following procedure is used. The interval [0, 1] (i.e., a range of $F_{i,q}(x, y)$) is broken into the $[t_0, t_1], [t_1, t_2] \ldots [t_{n-1}, t_n]$, where $0 = t_0 < t_1 < \ldots < t_n = 1$ is a previously selected set of values. For each function $f_i$, an integer number q from the interval $[0, c_i-1]$ and an integer number j from the interval [0, n−1] are chosen. A weight $W_{F,q,i,j,hx,hy}$ can be calculated (prior to the application of the algorithm), where $(h_x, h_y)$ traverses a set $O_{F,i}$, for example, [−7,7]×[−7,7] for all i (or each i can have its own set).

This set can be the same as $O_{LBP,i}$. The process of weight calculation includes generation of the detector $D_i$ with weights $w_i$. The $w_i$ is re-enumerated to obtain the $W_{F,q,i,j,hx,hy}$ weights.

For each point (x,y) of the image J, the sum of $W_{LBP,i,j,hx,hy}$ (for all indices $i,j,h_x,h_y$ such that $j=LBP_i(x+h_x,y+h_y)$) is calculated, and the sum of $W_{F,q,i,j,hx,hy}$ (for all indices $q,i,j,h_x,h_y$ such that $F_{i,q}(x+h_x,y+h_y)\in[t_j, t_{j+1}]$), is added, thus generating the Map(x, y) function. Then, a point (x, y) is selected, such that the value of the above operation Map(x, y) results in a maximum for that point.

The coordinates of the point in the initial image, corresponding to the (x, y) in the image J, will be the coordinates of the right pupil. Alternatively, instead of choosing the coordinates which yields the maximum value of Map(x, y), the Mean Shift method can be applied on the Map(x, y) function, which yields the best (x, y) coordinates for the pupil.

As an alternative to the above procedure, a Decision Tree method can be applied to detect pupil coordinates. The method operates with "features" containing the image pixel values only. However, the "features" could contain other functions (as described above), as well. The functions $F_{i,q}(x, y)$ and $LBP_i(x, y)$ are re-enumerated to obtain the set of functions $V_1(x, y), \ldots, V_{m+n}(x, y)$. Subsequently, $V_i(x, y)$ functions represent all features of the image.

For the purpose of the discussion it is assumed that a pre-trained decision tree DT is created. Having such a tree, the output is obtained using the procedure DecisionTreeOutput on the "features" $V_i$ and the tree DT. The result is the function Map(x, y).

Then, the Mean Shift procedure is applied on the Map (x, y) function to calculate the best (x, y) coordinates for pupil. After the coordinates of the right pupil are detected, the portion of the image contained in the rectangle $R_2$ is a mirror imaged relative to the vertical axis. The resulting image is subjected to the same operations as those performed with $J_1$ above, to detect the coordinates of the left pupil.

The original image is rotated such that the pupils are located on a horizontal line. Then, the rotated image can be stretched or compressed (maintaining the proportions of the image, in other words, compressed or stretched equally in both horizontal and vertical dimensions), so that the distance between the pupils is a predefined number of pixels.

Then, a rectangle is cut out from the image, such that the pupils relative to the right rectangle have a predefined coordinates. A new image I is generated. The size of the rectangle and the coordinates of the pupils are given and have fixed values for the particular algorithm, such that the distance between the pupils is equal to the distance between points with these coordinates, in the algorithm.

For example, a 128×128 square can be used as a rectangle. The points (24, 44) and (104, 44) can be used as coordinates of the pupils. Then, the distance between the pupils will equal to 80. The image I is then processed to reduce the effects of external lighting, as discussed earlier. As a result, the image J is generated, see FIG. 4.

A set of functions $g_1(x, y), g_2(x, y)$, etc. is provided. The function $g_i(x, y)=0$ if $x^2+y^2>p_i^2$. The function $g_i$ can be, for example, a function that equals to $$1 - \frac{|4x|}{p_i},$$

when $$|x| < \frac{p_i}{2}, x^2 + y^2 <= p_i^2,$$

and equals to 0 for all other points (x, y). The set of radii can be chosen, for example, $p_1=5.25, p_2=7.0$.

Also, function $f_i$ described above can be used as $g_i$. The linear transformation can be performed on the function $g_i$. Analogous to what is described above, a set of normalized convolutions is generated based on the image J, the functions $g_i$ and the values $p_i$. The function $g_i$ is rotated to an angle $q\pi/d_i$, where $q=0 \ldots d_i-1$. For example, $d_i=8$ for all i.

Then, in the normalized convolutions, the value at (x, y) is replaced with a maximum value in a particular (previously defined) neighborhood of point (x, y). Thus, a set of maximized convolutions is generated. The selection of neighborhood is the same as described above. For example, it is possible to take square areas with a size of 3 and 8 (for the values $p_1$ and $p_2$ selected above).

Finally, the value at the point (x, y) of every maximized convolution obtained using the function $g_i$ is divided by the sum of values at (x, y) of all maximized convolutions obtained using the function $g_i$. The resulting value is then raised to some power, for example, 0.5. As a result, the functions $G_{i,q}(x, y)$ are generated where $q=0 \ldots d_i-1$, with the values in the interval [0, 1].

Consider a set of points $(x_1, y_1), (x_2, y_2)$, etc. in the image. In order to generate this set of points, the image J is divided into equal sized rectangles (for example, 4×4-sized rectangles), and then the centers of these rectangles are used. Also, it is possible to take the points located on particular facial features. The template consists of the values $T_{i,q,j}=G_{i,q}(x_j, y_j)$ for all the functions $g_i(x, y)$, integer q from the interval $[0, d_i-1]$ and the points $(x_j, y_j)$.

According to the exemplary embodiment, the templates are compared in order to recognize a face. Two templates constructed in the manner described above are used as an input. The first template consists of the values $T_{i,q,j}$, and the second template consists of the values $T'_{i,q,j}$. For each J, the number $s_j$ is calculated as follows:

$$s_j = \sum_i \sum_{q=0}^{d_i-1} (T_{i,q,j} - T'_{i,q,j})^2$$

For each j, there is a $a_{j,k}$ for $k=0 \ldots n_j$ such that $0=a_{j,0}<a_{j,1}<\ldots<a_{j,nj}=1$, and also a set of weights $w_{j,k}>0$ for $k=0 \ldots n_j-1$. Then, for each j there is a $0<=l_j<n_j$ such that $a_{j,lj}<=s_j<a_{j,lj+1}$ (except for the case $s_j=1$, where $l_j=n_{j-1}$). For example, $n_j=6, a_{j,1}=0.014, a_{j,2}=0.024, a_{j,3}=0.04, a_{j,4}=0.0435, a_{j,5}=0.0835$ for all j can be used. The weights should be taken to satisfy a condition $w_{j,k}>w_{j,k+1}$.

For example, for each j a $w_j$ can be selected and values $w_{j,0}=7w_j, w_{j,1}=6w_j, w_{j,2}=3w_j, w_{j,3}=2w_j, w_{j,5}=0$ can be used. The values $w_j$ can be selected by testing all the possible values. For example, for each j, $w_j=0 \ldots 10$ can be tried and the set that has the fewest errors on some test set of images can be selected. Let $W_{max}=\Sigma_j \max_{0\leq k<n_j} w_{j,k}$.

According to the exemplary embodiment, a certain threshold T is defined by experiment so that if the templates S1 and S2 are constructed based on the faces of different people, then with a probability of A their degree of similarity will be less than T. Then, an access control method can be performed, based on the above approach. For example, by determining the probability that the person whose face is analyzed is not the person with rights to access a particular resource.

The system generates a template based on the face and estimates the degree of similarity to a previously stored template. In other words, if the degree of similarity is higher than the threshold, then the person will have access to the resource, and if the degree of similarity is below the threshold, then the person will be denied access. An unauthorized access attempt, based on the face recognition, will succeed with a probability of (100−A) %.

Note that the variations in conditions under which the pictures are taken can affect the quality of the face recognition. For example, lighting, angle of view, etc., can affect the probability of false positive and false negative recognitions. Thus, the access control system will work better if several different images are used for a particular person, taking into account possible differences in lighting conditions, angle, etc. In this case, the access control system will permit access, if for any one of the stored images the degree of similarity is higher than the threshold.

Another application of the present invention is finding a similar face among many faces (images) that are stored. For example, consider storage of digital pictures P1, P2 . . . PN. A picture P is received and needs to be compared with a set of pictures P1, P2 . . . PN. The photographs P1-PN have only a single face on them. Thus, the most likely correspondence between the photograph P and one of the photographs in the set P1-PN will be the one where the degree of similarity of the templates is the highest.

According to the exemplary embodiment, learning process is implemented. An area is monitored by one or several cameras that learn the appearances of every subject seen by cameras in order to better recognize them in the future or in stored footage.

Distinct subjects are automatically extracted from the video feed, and most distinctive facial templates are stored for each subject. This has a major advantage over storing just one or several images (templates) for each person, since the proposed algorithm automatically collects much broader set of templates in the changing environment. Thus, a person can be advantageously recognized in a broader set of conditions.

According to the exemplary embodiment, the algorithm works with Memory, the list storing some of the templates that cameras have seen. Each record in this list has the fields to store facial template and an ID. The ID is an integer number, unique for each seen subject. The ID can relate to a person, that is, the user could point and click to a face received from the camera (which has an ID), and enter a name for this face (and the ID). For example, "John Smith." Every time the algorithm recognizes a person having this ID, it will render his name ("John Smith") on the screen.

For each video feed (which comes from a separate camera) the following algorithm is executed:

1. Determine if faces are present in the current frame, and detect their positions (using face detection algorithm).

2. For each face (denoted as a CurrentFace) in the frame:

2.1. Create a template for CurrentFace (using the above method).

2.2. Look for a face in the previous frame (if such frame exists), which coordinates are the closest to the CurrentFace; if the template of such face is similar to the template of currentFace with more than Threshold1 value, add the ID of such face to the SimilarID list (which is empty in the beginning of the 2 loop), and set the BestID variable equal to ID. The Threshold1 could be a high value, for example 0.97.

2.3. For each face in the memory: if the similarity of template of the CurrentFace to the template of face from the memory is higher than Threshold2 (for example, 0.992), then add the ID of this face from the memory to the SimilarID list.

2.4. If the SimilarID list is not empty, then:

2.4.1. If the value of BestID is not set at 2.2, set the BestID variable to the identifier of most similar face from the memory.

2.4.2. If the SimilarID list contains more than one element, select the identifier of minimum numerical value from that list, and for each face in the memory with an identifier equal to any identifiers contained in the ID Candidate, assign the identifier with the selected identifier. The BestID is also assigned with this value.

2.4.3. If the similarity of the most similar face from the memory is less then Threshold3 (for example, 0.999—some very high value, but it should be less than 1, to prevent memory from cluttering), add the CurrentFace to the memory, with its ID assigned to BestID.

2.5. If ID Candidate list is empty for the CurrentFace during N consecutive frames (for example, N=5), which means that no similar face was found, add this face to the memory with a new ID, equal to the maximum ID in the memory plus one.

2.6. If the memory is limited, apply the following procedure to purge the memory and delete old and irrelevant face templates:

2.6.1. Count how many templates are there for each ID value.

2.6.2. If a certain ID has less than M templates (for example, 5) AND such an ID does not relate to a person name, then remove all templates with this ID from the memory.

2.6.3. Until the length of the memory is less than MaxMemoryAmount (for example, 2000), repeat: remove oldest seen face from the beginning of the memory, if its ID does not relate to a person.

Figure 5:
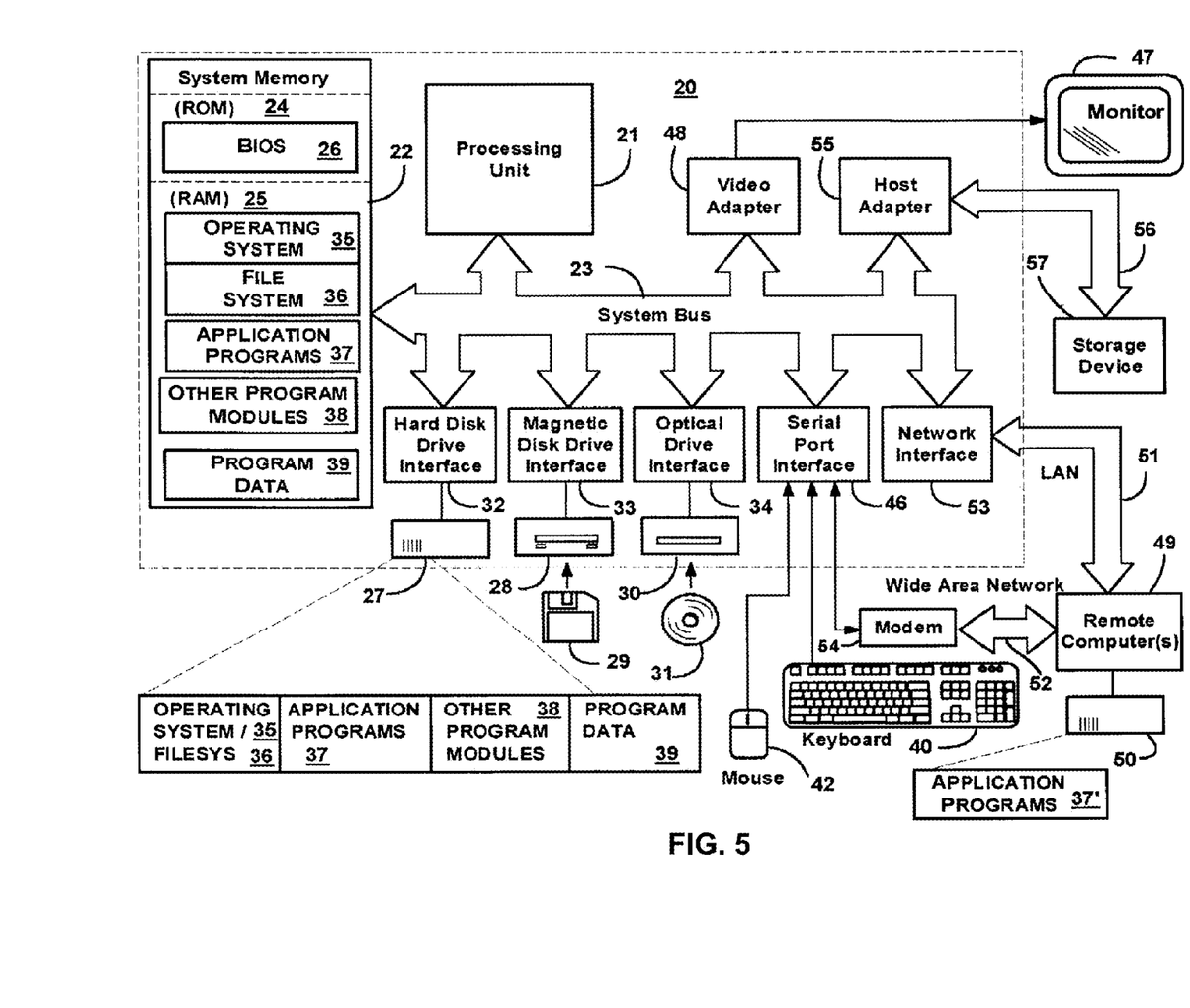
FIG. 5 illustrates a schematic of an exemplary computer system on which the invention can be implemented.

With reference to FIG. 5, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the computer 20, or portions thereof, may be stored in the remote memory storage device. It will be appreciated that the network connections shown are exemplary and other means of establishing a communications link between the computers may be used.

Note that the exemplary embodiment can be implemented on a processor of a digital camera or a cell phone. These devices have sufficient memory and can perform calculations needed for implementing the face recognition method.

Having thus described a preferred embodiment, it should be apparent to those skilled in the art that certain advantages of the described method and apparatus have been achieved. In particular, those skilled in the art would appreciate that the proposed system and method provide for an effective automated recognition of facial images or portraits within digital images.

It should also be appreciated that various modifications, adaptations and alternative embodiments thereof may be made within the scope and spirit of the present invention. The invention is further defined by the following claims.

What is claimed is:

1. A computer-implemented method for identifying pupil location within a facial image, the method comprising:
   receiving an image containing a facial image;
   identifying a rectangle containing the face by applying a face detection algorithm;
   cutting out the rectangle from the image and normalizing the rectangle to a standard size;
   determining sub-rectangles within the rectangle containing pupils;
   performing a transformation on each of the sub-rectangles;
   calculating local binary patterns (LBP) for each point of the sub-rectangles;
   calculating classifier outputs for each point of the sub-rectangles based on the LBPs; and
   identifying the pupil coordinates based on the classifier outputs in each sub-rectangle.

2. The method of claim 1, further comprising collecting statistics related to the pupil coordinates.

3. The method of claim 2, wherein the sub-rectangles are determined based on the statistics.

4. The method of claim 1, wherein the transformation is illumination compensation.

5. The method of claim 1, further comprising calculating convolutions of the sub-rectangles with filter functions, and calculating the classifier outputs based on both LBP and convolutions.

6. The method of claim 5, further comprising rotating the filter functions, and using several orientations of filter functions for convolutions.

7. The method of claim 1, further comprising calculating convolutions of the sub-rectangles with filter functions, and calculating the classifier outputs based on the convolutions.

8. The method of claim 1, wherein the identifying the pupil coordinates includes calculating a maximum of the classifier output in each sub-rectangle.

9. The method of claim 1, wherein the identifying the pupil coordinates includes calculating a Mean Shift on the classifier output in each sub-rectangle.

10. A system for face recognition, the system comprising:
    a processor;
    a memory coupled to the processor;
    a computer program logic stored in the memory and executed on the processor for implementing a method comprising:
    receiving an image containing a facial image;
    identifying a rectangle containing the face by applying a face detection algorithm;
    cutting out the rectangle from the image and normalizing the rectangle to a standard size;
    determining sub-rectangles within the rectangle containing pupils;
    performing a transformation on each of the sub-rectangles;
    calculating local binary patterns (LBP) for each point of the sub-rectangles;
    calculating classifier outputs for each point of the sub-rectangles based on the LBPs; and
    identifying the pupil coordinates based on the classifier outputs in each sub-rectangle.

* * * * *